2,688,072

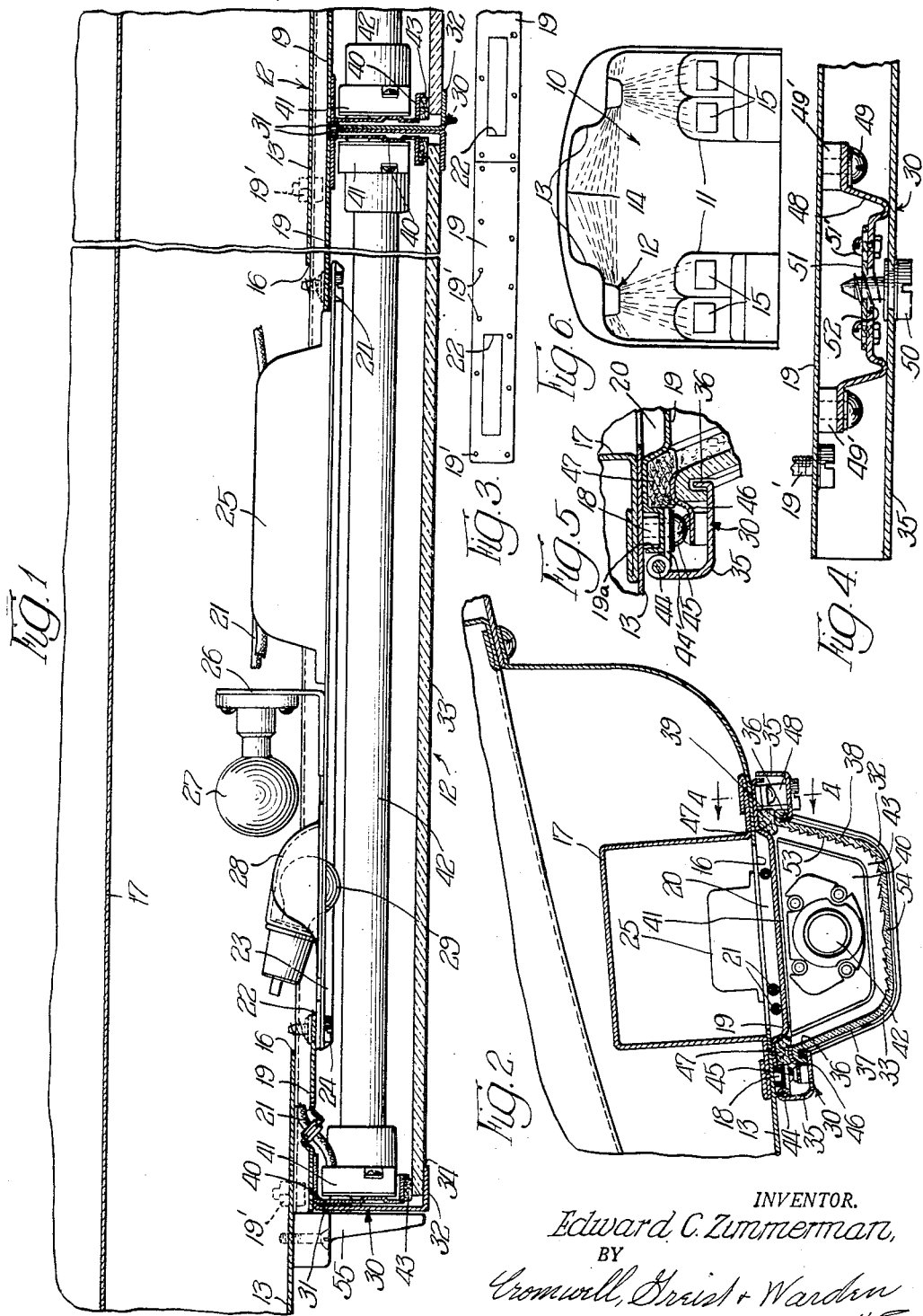
Aug. 31, 1954    E. C. ZIMMERMAN    2,688,072
VEHICLE LIGHTING FIXTURE
Filed Jan. 30, 1951
INVENTOR.
Edward C. Zimmerman,
BY
Cromwell, Greist + Warden
Attys Patented Aug. 31, 1954

UNITED STATES PATENT OFFICE 2,688,072

VEHICLE LIGHTING FIXTURE

Edward C. Zimmerman, Winnetka, Ill., assignor to Patent License Corporation, Chicago, Ill., a corporation of Illinois Application January 30, 1951, Serial No. 208,575

7 Claims. (Cl. 240—7.1)

This invention relates to an improved lighting fixture installation for commercial passenger vehicles such as busses, railway and trolley coaches, and the like.

It is a general object of the invention to provide a lighting installation for vehicles of the above class which is arranged in an extended length adjacent and parallel to the central aisle of the vehicle, directly above a series of passenger seats on a side of the aisle, which installation employs a plurality of extremely elongated extrusions of light transmissive synthetic plastic material, each provided with improved lens and related means for the purpose of directing light outwardly and upwardly toward the aisle ceiling, directly downwardly in condensed intensified form onto the reading planes of the seats, and outwardly onto a car card area.

Another object is to provide an improved light fixture for an installation of the above sort in which the fixture is supported and braced by novel and improved mounting means, with relation to a ceiling or half deck surface of the vehicle from which the fixture depends.

Another and more specific object of the invention is to provide a vehicle lighting installation made up of a continuous end-to-end series of extremely elongated light transmissive units, each of which units includes an elongated, one-piece transparent plastic extrusion of trough-like cross-section and an improved support for the extrusion which is specially shaped for bracing engagement with a special hooked side rim on the latter, in a manner to better sustain the relatively frail extrusion and prevent breakage thereof.

Another specific object is to provide a vehicle lighting fixture which is characterized by an improved, specially shaped rear mounting plate adapted to be applied to a vehicle half deck or ceiling and, when so applied to provide a wireway for electrical leads to the fixture's light source or sources; by a specially shaped, elongated trough-like light transmissive panel of improved type; and by an improved mounting frame which is pivotally mounted on one side thereof to the aforesaid rear plate so as to receive and support the panel, said frame nestingly engaging the sides of the trough-like frame to brace the latter, and coacting with the panel and rear plate to facilitate the locating of certain dust sealing provisions around adjacent meeting surfaces thereof.

A still further specific object is to provide a fixture of the above description which includes a pivotally mounted frame for releasably supporting a lighting panel in suspended relation to a ceiling or like surface and which has improved means to secure the free edge thereof in fixed relation to that surface.

A still further general object is to provide an elongated, extruded plastic type lighting fixture having the features mentioned in the preceding paragraphs which is, moreover, adapted to be associated in immediate end-to-end relation with other similar fixtures to constitute a substantially continuous lighting panel extending a major portion of the length of a vehicle, thus to provide the most efficient lighting of the vehicle interior, including car card zone, passenger seats and center aisle ceiling zone thereof, which is possible, all without subjecting passengers on either side of the aisle to any degree of annoying glare.

The foregoing statements are indicative in a general way of the nature of the invention. Other and more specific objects will be apparent to those skilled in the art upon a full understanding of the construction and operation of the device.

A single embodiment of the invention is presented herein for purpose of illustration, and it will be appreciated that the invention may be incorporated in other modified forms coming equally within the scope of the appended claims.

In the drawings,

Fig. 1 is a fragmentary view in vertical longitudinal section through the center of an installation according to the invention, illustrating structural features of the fixture and indicating the manner in which a given installation is made up of a plurality of the fixtures arranged in immediate end-to-end order;

Fig. 2 is a fragmentary view in transverse vertical section through the fixture of Fig. 1;

Fig. 3 is a fragmentary top plan view of a plurality of the backing or rear mounting plates of the fixture, further showing the intended end-to-end relationship of these parts in the installation, it being understood that a series of the fixtures is arranged along either opposite side of the vehicle aisle;

Fig. 4 is a fragmentary view in enlarged section on line 4—4 of Fig. 2, illustrating a detail of the frame mounting provisions of the fixture;

Fig. 5 is a fragmentary view in enlarged section similar to that of Fig. 2, more clearly illustrating an improved relationship of the rear mounting plate, light panel and supporting frame for the latter, in accordance with the invention; and Fig. 6 is a schematic view in transverse vertical section through a vehicle interior, illustrating the improved lighting effects which are achieved by the present installation.

Referring first to Fig. 6 of the drawing, showing the general layout of the installation, the reference numeral 10 generally designates the interior of a commercial passenger bus, railway or aircraft coach, etc., this being usually characterized by a longitudinally extending series of pairs of passenger seats 11 arranged on opposite sides of the central aisle. The fixtures of the present invention, generally designated 12, are mounted to depend beneath the usual side half deck or ceiling 13 on either side of the aisle, and the interior of this deck ordinarily accommodates electrical conduits, air conditioning or heating equipment, service lines, etc. The aisle-side deck molding curves upwardly and inwardly to the center aisle ceiling 14 of the interior. The reading planes of the passengers occupying seats 11 are designated 15.

Referring now to Figs. 1, 2 and 3, of the drawings, the deck surface 13 is disposed at a slight upward and aisleward angle in the zone where the fixtures 12 are applied. It is provided at longitudinally spaced points with elongated rectangular openings 16 normally covered by fixtures 12. A continuous reinforcing housing 17 of inverted U-shaped outline may be applied on the interior of the deck, in transverse bridging relation to the longitudinally extending openings 16.

Each of the fixtures 12 includes a rear mounting plate or panel 19 of specially shaped cross sectional outline, as illustrated in Figs. 1, 2, and 5. This plate has a shallow, upwardly opening groove 19a formed along the left-hand side thereof, as shown in Fig. 5, to accommodate certain longitudinally spaced tapping pads 18 which are spot welded therein. These pads are adapted to threadedly receive a number of hinge supporting screws, to be described. Further nut and bolt means 19' are employed along the sides of plate 19 to secure the same to deck 13.

Plate 19 is further shaped in its longitudinally extending central zone in a shallow, relatively wide, tray-like outline, thereby providing a longitudinally extending way or pocket 20 in which electrical wiring leads 21 for the fixture are received and shielded (see Figs. 1 and 2). The downward deformation involved in the provision of groove 19a and way 20 also serves another useful purpose, hereinafter referred to.

Each plate 19 is further provided with an elongated rectangular opening 22, located adjacent an end thereof and of length and width somewhat less than the length and width of the opening 16 in deck 13 immediately thereabove, and a supporting panel 23 for certain lighting and control devices of the fixture is secured about its perimeter to the plate 19. Panel 23 covers the opening 22 of plate 19 and self-threading screws 24 are used to hold the same in place. A conventional ballast unit 25, a right-angled bracket 26 mounting a low wattage service light 27, and a special light housing 28 in which a small emergency light 29 is disposed are all appropriately mounted on the upper or rear surface of panel 23 by riveting, spot welding or otherwise. The units 25, 27 and 28 project upwardly into the space housed by the member 17.

Each of the fixtures 12 includes an open rectangular hinge frame, generally denoted 30. It is preferably a steel stamping for the sake of rigidity and resistance to distortion, notwithstanding its open and relatively unbraced construction. This frame is punched out to provide a pair of opposed vertical end walls 31 (see Fig. 1) each provided with a longitudinally inwardly directed flange 32 of substantial width. The general shape of the end walls 31 and flanges 32 will be clear from Figs. 1 and 2 of the drawings, from which it is seen that the flanges 32 form in effect a cradle in which end portions of the longitudinally extending, open ended light transmitting panel 33 of the fixture, flush with its external surface, are supported. This panel is a continuous trough-shaped extrusion of a suitable synthetic plastic of well known type, being in an external cross sectional outline corresponding to that of the end flanges 32. Hence it is well supported about its outer perimeter at its opposite end margins by flanges 32. The flanges 32 are of sufficient width to safely support the panel 33, even in the event of some endwise shrinkage of the latter.

The sheet from which the frame 30 is formed is centrally punched out inwardly of the flanges to provide an elongated opening 34 through which the panel 33 is exposed, bordered by integral side rails 35 on opposite sides of the opening 34. These rails are shaped upwardly on their inner edges to provide a continuous elongated rib 36 on each side of and coextensive in length with the opening 34.

The plastic light transmitting panel 33 is specially shaped for support by the frame 30. In addition to the conformity of its outer sectional outline with that of the frame end flanges 32, its upwardly divergent side walls 37, 38 terminate in outwardly and downwardly hooked margins 39 which are coextensive in length with the panel section 33. These hooked portions engage or nest over the upturned ribs 36 of frame 30 thereby substantially bracing the relatively fragile plastic section, as well as preventing possibility of its lateral shift in the frame 30. This action is performed even though the panel 33 is free to move slightly in the endwise direction on the inturned frame flanges 32.

Sheet metal light socket supports 40 are spot welded on the rear mounting plate 19 of the fixture, being disposed immediately inwardly of the end walls 31 of its hinge frame 30, and conventional lamp sockets 41 for an elongated fluorescent tube 42 are appropriately secured thereon. A dust sealing strip 43 is disposed transversely of each end of the fixture, between an inwardly turned flange of the socket support 40 and the inner surface of the light panel 33, being compressed into dust sealing relation to the housing interior when the parts are in operative position.

The frame 30 is of a hinged type, being provided with a longitudinally extending hinge pivot 44 on its concealed or window side, as shown in Figs. 2 and 5. An inner or upper hinge leaf 44' associated with this pivot is secured to rear mounting plate 19 of the fixture by means of a series of screws 45 threaded into the tapping pads 18. As stated, the plate 19 is in turn secured to deck 13 by other means 19'. Frame 30 constitutes the lower leaf for hinge 44; and the light panel 33 is restrained from dropping out of the frame, when the latter is swung downwardly from the pivot 44, by means of a plurality of retaining clips 46. These are appropriately secured to the frame side rail 35 adjacent pivot 44 and they engage over the adjacent upper hooked edge margin 39 of the panel, as illustrated in Fig. 5. Longitudinally extending felt strips 47 are disposed along and over each of said margins 39, being clamped between the same and the rear mounting plate 19 to dust seal the interior of the latter. In this it should be noted that the special shaping of plate 19 affords downwardly facing grooves or shoulders which greatly facilitate locating and placing of the longitudinal felt strips.

The fixture unit 12 is secured to the deck 13 along its aisle side by the means illustrated in Figs. 2 and 4 of the drawings. As shown in Fig. 4, the rear mounting plate 19 has a plurality of stop brackets 48 of generally W-shaped outline secured thereto by screws 49. Screws 49 are received by nuts 49' welded to the under surface of the plate. These brackets act as stops to automatically position the upturned edge of the adjacent rail 35 of frame 30 in proper relation to the deck 13, overlapping the edge of plate 19 (see Fig. 2) and spaced from deck 13, by engaging the inner surface of that rail. Chipping of the painted surface of the deck is thus avoided. An upwardly extending, self-threading screw 50, which is swivelled in the rail, extends upwardly through a central hole 52 in the bracket and threadedly engages a small plate 51 fixedly mounted on the bracket by small screws 51'. The plate 51 may be made longitudinally adjustable relative to the bracket by simply slotting the holes through which screws 51' are inserted. This permits positioning of the bracket exactly in accordance with the position of the screw 50 after the frame 30 has been hung on deck 13.

One of the important advantages of the improved fixture arises from the great length in which it is possible to manufacture the light panels 33 by the plastic extrusion process. These open ended, trough-like members are in the neighborhood of 3½ feet in length, but their actual length is limited, in effect, only by the length in which the fluorescent tubes 42 are commercially available. A highly desirable continuity of appearance lengthwise of the installation is obtained when the fixtures 12 are assembled in immediate end-to-end relation, as shown in Fig. 1. In actual car installations of about 28 feet only eight of the fixtures were required.

It is evident that a synthetic plastic extrusion of such extended length is inherently somewhat frail and subject to deformation or breakage unless well braced in its intended mounting. Panel 33 obtains the needed support and bracing by the nested engagement of rail rim 36 of frame 30 and the downwardly hooked side margins 39 of the panel. This is accomplished by adequate support of the open panel ends by flanges 32.

Another important feature of the invention concerns the provisions in panel 33 to control light emitted thereby. To this end the upwardly extending, aisle-side wall 38 thereof is provided with a prism structure 53 throughout its entire internal surface, which structure acts to direct rays from the fluorescent tube 42 laterally and upwardly onto the aisle ceiling. Direct glare into the eyes of persons seated on the opposite side of the aisle is avoided, yet the upper central area of the vehicle interior is well illuminated, as illustrated in Fig. 6. The transversely extending bottom area of the panel, designated 54, is shaped in a prismatic lens configuration 54 which directs a controlled and intensified beam directly downwardly onto the reading planes 15 of passengers therebeneath. The window side wall 37 of panel 33 is preferably left clear and plain in cross sectional shape for the transmission of light directly outwardly onto the adjoining car card area of the vehicle. Panel 33 may be slightly translucent throughout for the purpose of concealing the elements mounted interiorly thereof, and at the same time affording a desired measure of light control; however, it is evident that it may also be extruded in a clear plastic.

In use, the fixture units 12 are arranged in immediate end-to-end adjacency, as illustrated in Figs. 1 and 3 of the drawings, enabling an installation of any desired length to be furnished by using fixtures which are entirely identical in character. Shaped, ornamental end finish elements 55 are applied to the opposite ends of a thus assembled series to provide a very attractive yet very efficient installation.

I claim:

1. A vehicle lighting fixture comprising a frame having parallel side rails and a pair of opposed end members inwardly flanged toward one another, and an extruded, longitudinally and horizontally extending light transmissive panel of trough-like outline having opposed open ends, flush extensions at said ends of the exterior horizontal surface of said trough-like outline resting on the flanges of said frame end members, said panel being provided with opposed, longitudinally extending side walls in interlocked engagement with said frame side rails, and means to hingedly mount one side of said frame in a supporting surface, said means comprising a mounting plate to which said last named frame side is pivoted, said plate being embossed to provide a shallow rearwardly facing recess spaced from opposite margins of the plate, means to secure the other side of said frame to said plate, and compressible sealing material located immediately to one side of the embossment defining said recess, said material being clamped between said plate and panel side walls.

2. A vehicle lighting fixture comprising a frame having a pair of parallel, laterally spaced side rails and a pair of opposed end members inwardly flanged toward one another, and an extruded longitudinally and horizontally extending, light transmissive panel of trough-like outline having opposed open ends, flush extensions at said ends of the exterior horizontal surface of said trough-like outline resting on the flanges of said frame end members, said panel being provided with opposed, longitudinally extending side walls which terminate in hook-shaped bracing elements for nesting engagement with said frame side rails, and means to hingedly mount one side of said frame to a supporting surface, said means comprising a mounting plate to which said last named frame side is pivoted, said plate being embossed to provide a shallow rearwardly facing recess spaced from opposite margins of the plate, means to secure the other side of said frame to said plate, and compressible sealing material located immediately to one side of the embossment defining said recess, said material being clamped between said plate and panel side walls.

3. A passenger vehicle lighting installation comprising a plurality of fixtures as defined in claim 1 arranged in end-to-end alignment, with adjacent end members of successive frames in immediate side-by-side adjacency.

4. A passenger vehicle lighting installation comprising a plurality of fixtures as defined in claim 2 arranged in end-to-end alignment, with adjacent end members of successive frames in immediate side-by-side adjacency.

5 A vehicle lighting fixture comprising an elongated frame having integral, laterally spaced side rails and integral, inwardly flanged end members, and an extruded horizontal light transmissive panel of elongated outline having opposed open ends and surfaces adjacent said ends which are flush extrusions of the external horizontal surface of said panel, said extension surfaces resting on the flanges of said frame end members, said panel having opposed, longitudinally extending side margins which are shaped to provide terminal suspending hooks, said frame side rails being provided with longitudinally extending, upturned ribs nestingly engaged by said panel hooks, and means to hinge one side of said frame to a supporting surface, said means comprising a mounting plate to which said last named frame side is pivoted, said plate being embossed to provide a shallow rearwardly facing recess spaced from opposite margins of the plate, means to secure the other side of said frame to said plate, and compressible sealing material located immediately to one side of the embossment defining said recess, said material being clamped between said plate and suspending hooks.

6. A vehicle lighting fixture comprising an elongated light transmissive panel fabricated from a single synthetic plastic extrusion in an open-ended, trough-like cross sectional outline, said panel being provided with an upwardly extending side wall, an intermediate, generally horizontal portion adjoining said wall, and a further upwardly extending side wall adjoining said intermediate portion, said side walls terminating in downwardly hooked marginal portions, a supporting frame for said panel having a pair of laterally spaced, longitudinally extending side rails each terminating in an inner, upwardly disposed rib, and having a pair of end members each provided with an inwardly extending flange shaped to correspond with the cross sectional shape of the open end of said light transmissive panel, said end members and rails defining an elongated opening through which said panel is exposed in depending relation to said frame, the open ends of said panel resting on said inwardly extending frame flanges and the hook marginal portions thereof nestingly engaging over the ribs of said side rails, a mounting plate to which one of said side rails is pivoted and means releasably securing the other side rail to said plate.

7. A lighting fixture comprising a generally flat mounting plate, an apertured frame pivoted along one side to said plate, said frame having an externally and upwardly flanged member along the opposite side thereof, a light transmissive panel secured in the frame aperture, and means to secure said last named side of said frame to said plate, comprising a stop bracket separate from said frame secured to a surface of said mounting plate facing said frame, said bracket being disposed internally of said flanged frame member and being engageable and disengageable by the latter in pivoting the frame relative to said plate, and a screw extending through said member and threadedly engaged with said bracket, said frame member abutting said bracket to predeterminedly position the flange thereof relative to the mounting plate.

References Cited in the file of this patent

UNITED STATES PATENTS

| Number | Name | Date |
|---|---|---|
| 2,173,899 | Doane | Sept. 26, 1939 |
| 2,269,182 | Claspy et al. | Jan. 6, 1942 |
| 2,269,554 | Rolph | Jan. 13, 1942 |
| 2,335,737 | Campen | Nov. 30, 1943 |
| 2,336,016 | Jayne et al. | Dec. 7, 1943 |
| 2,338,559 | Winklemeyer | Jan. 4, 1944 |
| 2,434,049 | Nordquist | Jan. 6, 1948 |
| 2,570,907 | Arenberg et al. | Oct. 9, 1951 |
| 2,583,939 | French et al. | Jan. 29, 1952 |